United States Patent [19]

Enterline et al.

[11] Patent Number: 4,562,531
[45] Date of Patent: Dec. 31, 1985

[54] INTEGRATED CONTROL OF OUTPUT AND SURGE FOR A DYNAMIC COMPRESSOR CONTROL SYSTEM

[75] Inventors: Larry L. Enterline, Waite Hill; Azmi Kaya, Akron, both of Ohio

[73] Assignee: The Babcock & Wilcox Company, New Orleans, La.

[21] Appl. No.: 539,774

[22] Filed: Oct. 7, 1983

[51] Int. Cl.⁴ .................. F25D 17/00; F25B 49/00
[52] U.S. Cl. .................... 364/164; 62/201; 415/27; 417/19; 417/32
[58] Field of Search ........... 364/164, 165, 166, 431.02; 417/19, 20, 32; 62/228.1, 201; 415/26, 27, 28

[56] References Cited

U.S. PATENT DOCUMENTS

| | | | |
|---|---|---|---|
| Re. 30,329 | 7/1980 | Rutshtein et al. | 415/27 |
| 3,994,623 | 11/1976 | Rutshtein et al. | 417/20 X |
| 4,142,838 | 3/1979 | Staroselsky | 417/20 |
| 4,275,987 | 6/1981 | Kountz et al. | 62/228.1 X |
| 4,282,718 | 8/1981 | Kountz et al. | 62/201 X |
| 4,459,818 | 7/1984 | Kaya et al. | 62/210 X |
| 4,464,720 | 8/1984 | Agarwal | 364/494 X |

Primary Examiner—Jerry Smith
Assistant Examiner—Allen MacDonald
Attorney, Agent, or Firm—Vytas R. Matas; Robert J. Edwards

[57] ABSTRACT

An integrated control system for both the output and surge protection of a centrifugal compressor in a chilled, water system is provided by biasing the output of a feed forward and cascade centrifugal compressor output control logic module with the output of a coordinating control logic module, which utilized a surge control logic module output to establish the biasing signal.

9 Claims, 4 Drawing Figures

INTEGRATED CONTROL OF OUTPUT AND SURGE FOR A DYNAMIC COMPRESSOR CONTROL SYSTEM

TECHNICAL FIELD

The present invention relates generally to centrifugal compressor control systems and particularly to such a control system for a water chiller having an integrated control for both the compressor output and surge protection.

BACKGROUND ART

A refrigeration cycle is utilized to chill water for use in one or more processes. The cycle includes an evaporator through which water to be chilled is passed and in which expanding coolant is utilized to draw heat from the water. The coolant is supplied to the evaporator over a coolant circuit containing a compressor, a condenser, and a control valve for controlling the amount of cooling effect.

To conserve energy, it is desirable to optimize chilled water temperature by critically controlling the flow of coolant and the use of power in the coolant cycle as well as the chilled water cycle. This requires a properly integrated compressor control.

As is known, there are two major control loops in a compressor. The one loop is used for controlling a process variable (such as chilled water temperature) by manipulating the compressor load. The other loop is used for protecting the compressor against surging; namely, surge control for a stable operation. These two control loops, when independently operated in separate nonintegrated loops, interact and cause unnecessary oscillations. When the compressor operates near the surge line, these oscillations become damaging.

There are known surge controls based on both surge detection and compressor load variation. However, the surge control as used to initiate compressor load variation rather than integrate the surge control with the load demand of the compressor. An example of such a surge control system may be found in U.S. Pat. No. 4,142,838. Nor are there any known control systems which coordinate compressor operation with surge protection to insure optimized operation of the two for optimized chilled water delivery.

SUMMARY OF THE INVENTION

The present invention solves the problems associated with the prior art systems as well as others by providing a chilled water temperature control system having an integrated control of both output and surge of the centrifugal compressor of the system.

To accomplish this the output of the compressor control logic is modified by a coupling or coordinating circuit prior to allowing the compressor control logic circuit to act on the compressor. This coordinating circuit utilized the output of a surge control circuit to establish a biasing signal to the output of the compressor control logic to increase compressor output to compensate for the amount of bypassed compressor output due to the surge control.

In view of the foregoing, it will be seen that one aspect of the present invention is to provide an integrated compressor control for both compressor output and surge protection.

Another aspect of the present invention is to provide an integrated compressor control for a chilled water system.

These and other aspects of the present invention will be more fully understood after consideration of the following description of the preferred embodiment and its accompanying drawings.

DESCRIPTION OF THE PREFERRED EMBODIMENT

Figure 1:
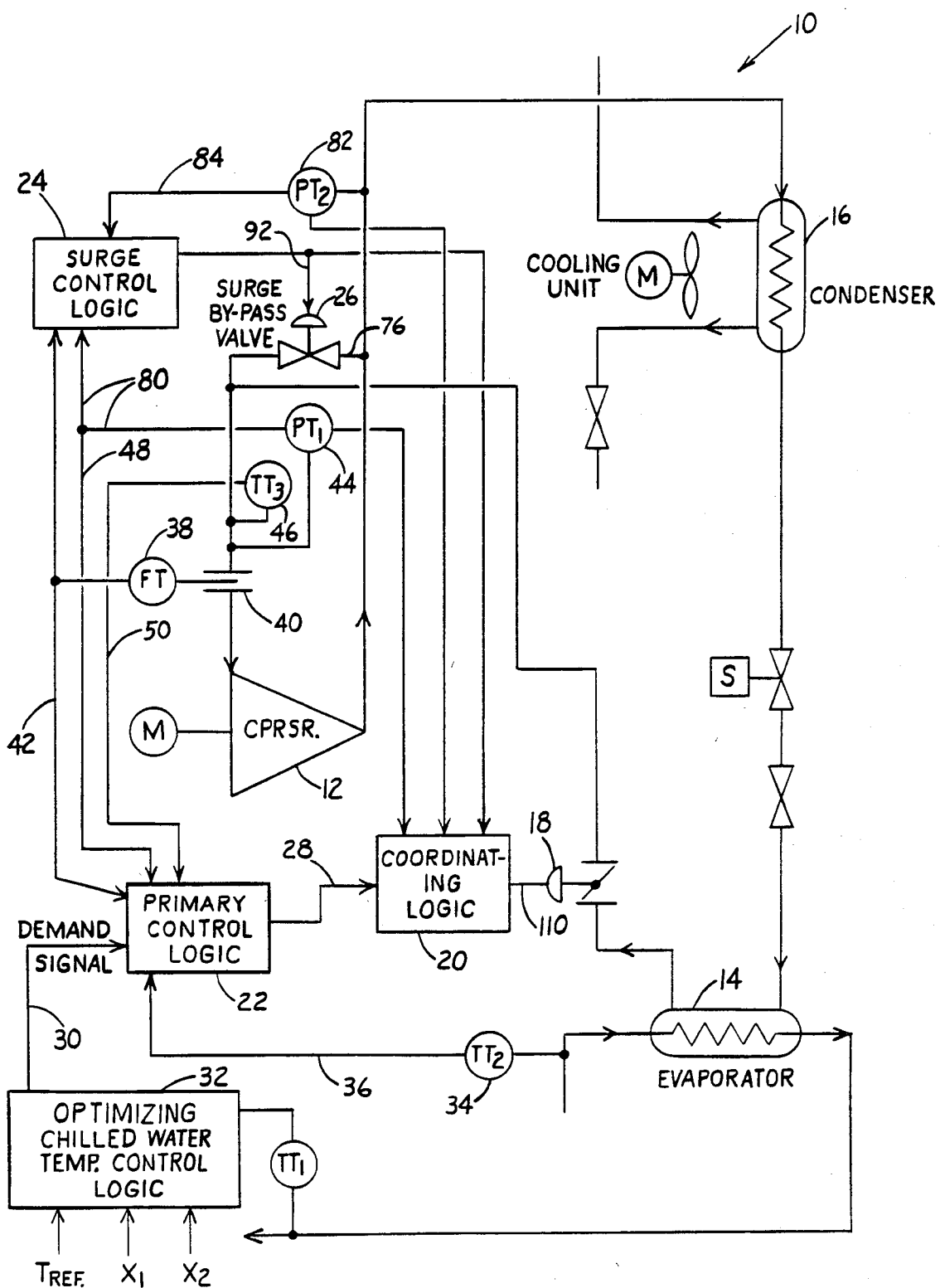
FIG. 1 is a block diagram of the chilled water system of the present invention.

Referring now to the drawings, FIG. 1 shows a basic water chiller system 10 having a centrifugal compressor 12 for pumping fluid from the evaporator 14 to the condenser 16. The amount of fluid pumped by the compressor 12 will be controlled by a valve 18 located between the evaporator 14 and the inlet of the compressor 12 which will restrict the amount of fluid drawn by the compressor 12 depending upon the controlled position of the valve 18.

The valve 18 is controlled by a coordinating logic control module 20. This control module 20 combines control signals from a primary control logic module 22 and a surge control logic module 24 into an integrated control signal for the compressor 12 which will bias the chilled water demand signal from the primary control logic module 22 with a signal from the surge control logic module 24.

The surge control signal from module 24 is indicative of the amount of bypass flow across the compressor 12 allowed by a bypass valve 26 controlled by the surge control logic module 24 and represents a required increase in compressor 12 output required to compensate for this bypass. This bypass is required to protect the compressor 12 from surge oscillations caused by the compressor 12 having to sometimes operate beyond the manufacturer's established compressor 12 surge line in either a restricted inlet flow or pressure output condition.

The primary control logic module 22 is basically a feed forward-cascade control module for establishing a main load demand output signal along line 28 to the coordinating control logic module 20. The main demand signal to the primary control logic module 22 is received along line 30 from an optimizing temperature control logic system 32 described in co-pending U.S. Pat. application Ser. No. 6,498,376, filed: May 26, 1983, entitled: "SUPERVISORY CONTROL OF CHILLED WATER TEMPERATURE", now U.S. Pat. No. 4,459,818, issued July 17, 1984, by Azmi Kaya and Michael Scott Willey; and, the reader is referred thereto for further information and details thereof. The main function of this system 32 is to optimize chilled water demand on a cost efficiency basis. The feed forward control variable of the module 22 is the temperature $TT_2$ of the evaporator 14 inlet as sensed by transmitter 34 and connected to the primary module 22 along line 36. The cascade control signal variable is mass flow through the compressor 12 and uses the flow FT measurement into the compressor 12 as measured by transducer 38 measuring the flow through an orifice 40. The transmitter 38 sends its signal to the primary module 22 along line 42. To give a true mass flow measurement to the primary control logic module 22 compensating measurements of compressor inlet fluid pressure PT, and temperature $TT_3$ are taken respectively by transducers 44 and 46 and conducted to the module 22 along respective lines 48 and 50.

Figure 2:
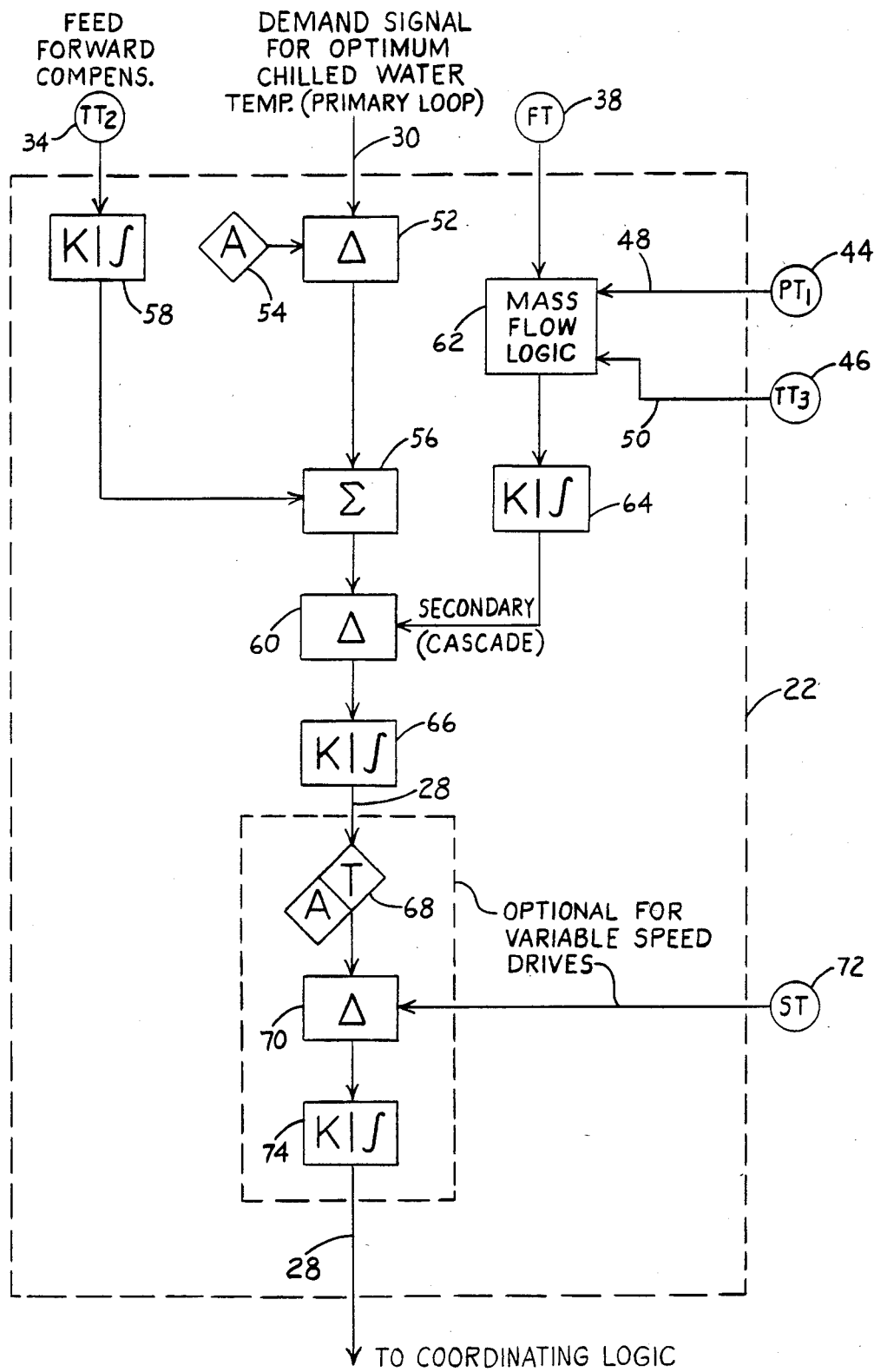
FIG. 2 is a function block diagram of the primary control logic block of the FIG. 1 system.

Turning to FIG. 2, the details of the primary control logic module are shown in standard SAMA control logic symbols representative of electronic, pneumatic, or mechanical implementation.

The demand signal 30 is first sent to a difference station 52 and compared with the output of a set point station 54 which may be manual and would be used to allow operator override or input of the main demand signal 30. The signal from the difference station 52 is then added with the feed forward control signal of evaporator inlet temperature $TT_2$ in summing station 56. The feed forward control signal is modified in the proportional and integral controller 58 prior to sending it to the summing station 56 to conform it to the dynamics of the control loop.

The feed forward temperature control signal is a secondary variable signal which disturbs the primary variable signal and hence acts as an anticipatory signal of a future change in the primary variable. In our case, the primary variable; namely, optimized chilled water output 30 will be affected by the evaporator 14 inlet temperature $TT_2$ and, hence, this is a proper feed forward secondary variable to initiate corrective action in the system before the primary variable error develops.

The output of the summing station 56 is then sent to a comparator station where the output is compared with a cascade control signal of mass flow through the compressor 12. The mass flow signal is developed in a mass flow logic module 62 utilizing the flow input FT, pressure input $PT_1$, and the temperature input $TT_3$. The mass flow output signal from module 62 is modified for control loop dynamics in a proportional integral controller 64 prior to comparison in the comparator station 60. The function of this cascade control is to provide a corrected output of compressor flow. The demand signal from summing station 56 sets up a certain compressor flow requirement and the cascade signal insures that that particular mass flow requirement is being provided.

The output of the comparing station 60 is then sent to a main controller 66 for the primary control loop. This controller 66 is a proportional integral controller and may be used to directly control the final control element such as the valve 18 through its connection with the coordinating control logic module 20. Such control is used for compressors 12 that are constant speed and utilize vane control or inlet throttling.

For systems that utilize variable speed driven compressors, the output of the controller 66 is sent through a manual/auto station 68 to a difference station 70 where the compressor desired output as desired speed is compared with the actual compressor speed as measured in a speed transmitter 72. The output of the difference station 70 is then smoothed out by a controller 74.

Thus, the output 28 of the primary control logic module 22 is a signal representative of a compressor 12 output which is fast responding and stabilized by feed forward-cascade control and may be used for compressor control. However, if the compressor is in a surge condition, the output of the compressor 12 will be partially bypassed through the valve 26 back to the inlet and the demand signal 28 will not take account of such a bypassed compressor 12 output.

Figure 3:
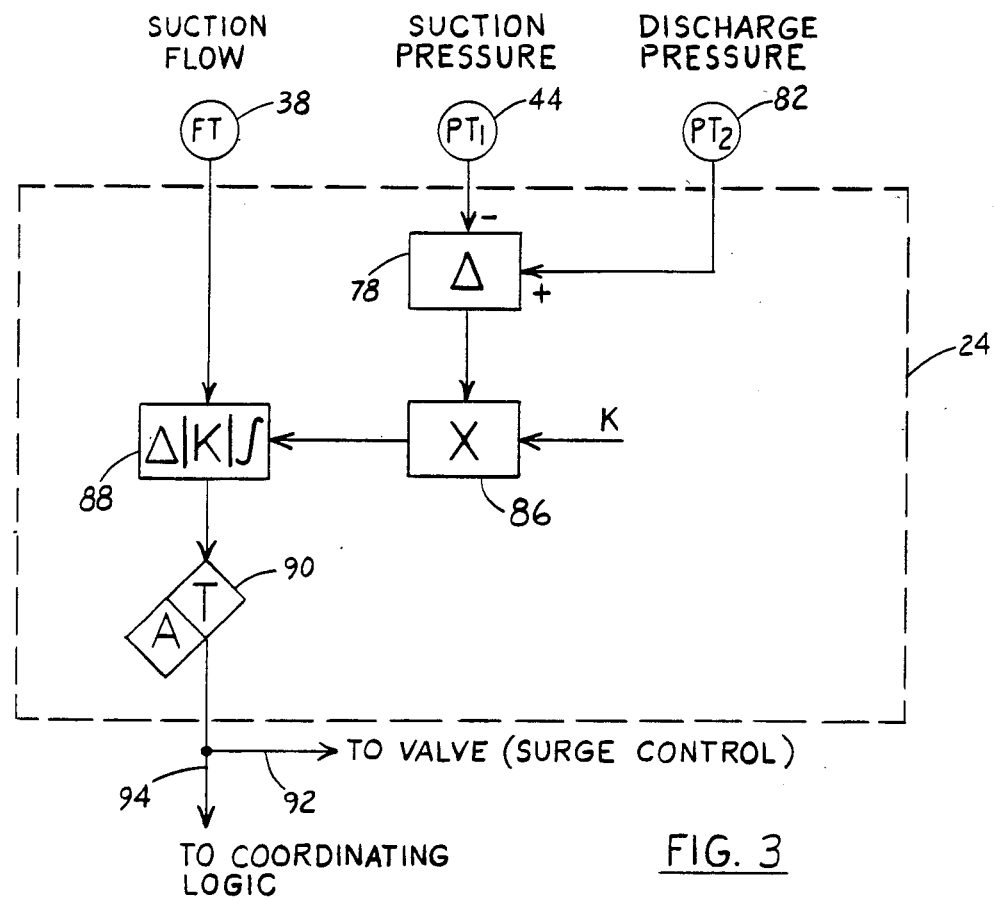
FIG. 3 is a function block diagram of the surge control logic of the FIG. 1 system.

To better see the action of the surge control logic module, we refer to FIGS. 3 and 1. Each compressor has a manufacturer's determined surge curve of which pressure vs flow defines proper compressor operation to the right of the surge line and starved inlet flow oscillating operation to the left of the surge line. To prevent an inlet starved operating condition, the surge control logic module 24 controllably opens the valve 26 to bypass compressor 12 outlet flow back to the inlet along a bypass line 76.

The surge control logic module defines the surge line for the compressor 12 by comparing the suction pressure $PT_1$ and the discharge pressure $PT_2$ in a difference station 78. The particular values for suction pressure $PT_1$ is measured by the transmitter 44 and is sent to the surge control logic module along line 80 while a particular discharge pressure $PT_2$ is measured by a transducer 82 and is sent to the surge control logic module 24 along line 84. Thus, a point on the surge line is defined. A point on a surge control line offset from the surge line by a distance K is set up in the multiplying station 86 which defines a flow point on the surge control line. This surge control line flow point is compared in a proportional, integral, and derivative controller with the actual flow FT measured by transducer 38 to determine what side of the surge control line the actual flow appears. If the actual flow FT is less than the output of the multiplier 86, the controller 88 will act through the manual/auto station 90 to open the valve 26 along control line 92. The condition of the valve 26 will also be transmitted along line 94 to the coordinating logic control module 20.

Figure 4:
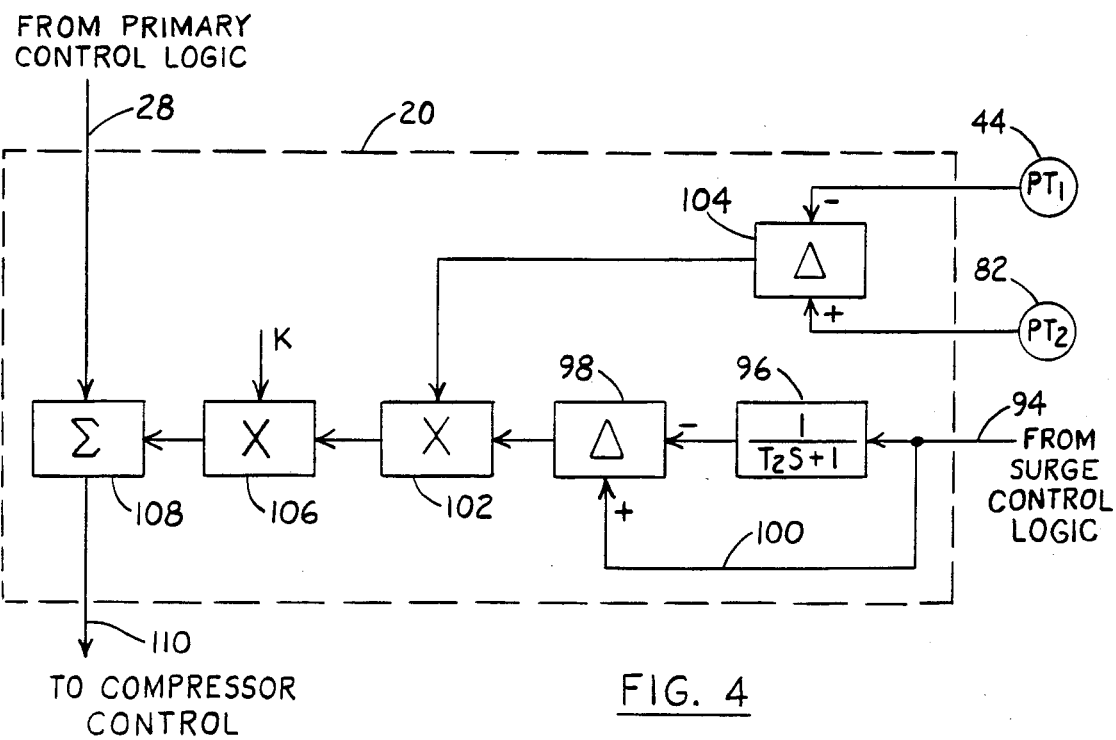
FIG. 4 is a function block diagram of the integrating control logic of the FIG. 1 system.

FIG. 4 shows in SAMA logic symbols the details of the coordinating logic module 20. The output from the surge control logic module 24 is sent through a lead/lag controller 96 to a difference station 98 as well as directly to the difference station 98 along a bypass line 100. The lead/lag controller 96 is a transfer function representing a first order lag with T as the time constant of the lag. Thus the difference station will subtract the decaying signal of the controller 96 from the surge control logic signal 94 until the two are equal to stabilize the surge control logic signal 94. The signal from the difference station 98 is then sent to a multiplying station 102 where it is multiplied by the difference in compressor inlet and outlet pressure as determined by the difference station 104 which is connected to both the inlet pressure $PT_1$ transmitter 44 and the outlet pressure $PT_2$ transmitter 82. The multiplying station 102 is used to amplify the effect of a high pressure difference across the compressor as being indicative of an extremely hazardous surge condition. The output of the multiplying station 102 is sent to a correction factor multiplying station 106 where the signal is multiplied by a factor K to compensate for system induced errors such as compressor 12 wear as well as to match the signal to the control loop. The signal from the multiplying station 106 thus forms the bias signal for the output 28 of the primary logic control module 22 by being added to the signal 28 in a summing station 108 the output 110 of which is used to control the compressor by way of the valve 18.

Clearly, certain modifications and improvements will occur to those skilled in the art upon perusal of this specification. By way of example, the valve 18 could be the compressor 12 speed or vane control or the surge control logic module could use other known surge control schemes. Such modifications and improvements as well as others are deleted herein for the sake of conciseness and readability but are properly included in the scope of the following claims.

We claim:

1. A chilled water system having a centrifugal compressor and an integrated control system for simultaneously controlling both the load output and surge protection of the compressor comprising:

valve means for controlling the amount of fluid drawn by the compressor;

compressor control logic means for establishing a first control signal indicative of desired compressor load output;

compressor surge control logic means for establishing a second control signal indicative of required flow bypass across the compressor;

coordinating control logic means for establishing a bias signal to said first control signal which bias signal is related to said second control signal to control said valve means in response to said biased first control signal; and said compressor control logic means including:

means for establishing a compressor main control signal of optimum chilled water demand from the chilled water system;

means for establishing a feed forward control signal indicative of the actual output temperature of the output of the chilled water system combined with the output of said compressor main control signal into a first combined control signal; and means for establishing a cascade control signal indicative of the mass flow through the compressor combined with said combined control signal from said feed forward means to thereby form said first control signal.

2. A chilled water system as set forth in claim 1 wherein said coordinating control logic means includes:

means for establishing a pressure control signal as a function of the pressure at the compressor inlet and outlet; and multiplying means for combining the second control signal from said compressor surge control logic means with the pressure control signal of said pressure control signal establishing means to form the bias signal of the coordinating control logic means.

3. A chilled water system as set forth in claim 2 wherein said coordinating control logic means further includes:

a lead-lag control having an input connected to the second control signal of said compressor surge control means; and a difference station having inputs connected to the output of said lead-lag control and to the second control signal of said compressor surge control means to establish an output indicative of the difference between the two inputs.

4. An integrated control system for a dynamic compressor for simultaneously controlling both the load output and the surge protection of the compressor comprising:

valve means for controlling the output of the compressor;

compressor control logic means for establishing a first control signal indicative of desired compressor load output;

compressor surge control logic means for establishing a second control signal indicative of required flow bypass across the compressor;

coordinating control logic means for establishing a bias signal to said first control signal which bias signal is related to said second control signal to control said valve means in response to the biased first control signal of said coordinating logic means; and said coordinating means includes:

means for establishing a pressure control signal as a function of the pressure at the compressor inlet and outlet; and multiplying means for combining the second control signal from said compressor surge control logic means with the pressure control signal of said pressure control signal establishing means to form the bias signal of the coordinating control logic means.

5. An integrated system as set forth in claim 4 wherein said coordinating control logic means further includes:

a lead-lag control having an input connected to the second control signal of said compressor surge control means; and a difference station having inputs connected to the output of said lead-lag control and to the second control signal of said compressor surge control means to establish an output indicative of the difference between the two inputs.

6. A chilled water control system for establishing a control signal indicative of the desired load output from a centrifugal compressor of the system comprising:

first means for establishing a compressor main control signal indicative of optimum chilled water demand from the chilled water system;

second means for establishing a feed forward control signal indicative of the actual output temperature of the output of the chilled water system combined with the output of said compressor main control signal into a first combined control signal; and third means for establishing a cascade control signal indicative of the mass flow through the compressor combined with said first combined control signal to form a second combined control signal for indicating desired compressor load output.

7. A chilled water system as set forth in claim 6 further including:

fourth means for establishing a second control signal indicative of required flow bypass across the compressor; and fifth means for establishing a bias signal to said second combined control signal which bias signal is related to said second control signal.

8. A chilled water system as set forth in claim 7 wherein said fifth means includes:

means for establishing a pressure control signal as a function of the pressure at the compressor inlet and outlet; and multiplying means for combining the second control signal from said compressor surge control logic means with the pressure control signal of said pressure control signal establishing means to form the bias signal of the coordinating control logic means.

9. A chilled water system as set forth in claim 8 wherein said fifth means further includes:

a lead-lag control having an input connected to the second control signal of said compressor surge control means; and a difference station having inputs connected to the output of said lead-lag control and to the second control signal of said compressor surge control means to establish an output indicative of the difference between the two inputs.

* * * * *